United States Patent
Ernsberger, IV

(10) Patent No.: US 6,625,922 B1
(45) Date of Patent: *Sep. 30, 2003

(54) DISPOSABLE INSECT TRAP, KIT, AND METHOD OF LURING AND RETAINING INSECTS THEREIN

(76) Inventor: Earl R. Ernsberger, IV, 9608 Riddick Pl., Matthews, NC (US) 28105

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 706 days.

(21) Appl. No.: 08/606,762

(22) Filed: Feb. 27, 1996

(51) Int. Cl.$^7$ .................................................. A01M 1/10
(52) U.S. Cl. .......................................... 43/122; 43/107
(58) Field of Search ........................... 43/122, 121, 131, 43/113, 107

(56) References Cited

U.S. PATENT DOCUMENTS

| | | | |
|---|---|---|---|
| 663,728 A | | 12/1900 | Church |
| 722,143 A | * | 3/1903 | Raymond ..................... 43/122 |
| 794,323 A | * | 7/1905 | Small ............................ 43/131 |
| 805,352 A | * | 11/1905 | Edgar ............................ 43/107 |
| 828,128 A | | 8/1906 | Laube |
| 1,045,870 A | * | 12/1912 | Miller ........................... 43/107 |
| 1,084,647 A | * | 1/1914 | Libison ......................... 43/122 |
| 1,131,120 A | * | 3/1915 | Crawford ...................... 43/122 |
| 1,561,832 A | | 11/1925 | Corsi et al. |
| 1,597,287 A | | 8/1926 | Pinkerton |
| 1,611,515 A | * | 12/1926 | Crown .......................... 43/107 |
| 1,685,241 A | | 9/1928 | Northrup |
| 1,812,512 A | * | 6/1931 | Carballo ....................... 43/107 |
| 2,046,430 A | * | 7/1936 | Rutherford ................... 43/107 |
| D221,074 S | | 7/1971 | Levey ........................... D22/19 |
| 3,708,908 A | | 1/1973 | Levey ........................... 43/114 |
| 3,959,914 A | * | 6/1976 | Kaveloski .................... 43/107 |
| 4,035,946 A | * | 7/1977 | Rapp ............................ 43/131 |
| 4,145,836 A | | 3/1979 | Zeller ........................... 43/115 |

(List continued on next page.)

FOREIGN PATENT DOCUMENTS

| | | | | |
|---|---|---|---|---|
| JP | 406245677 | * | 9/1994 | ................... 43/107 |
| WO | 094019938 | * | 9/1994 | ................... 43/107 |

OTHER PUBLICATIONS

Pickens et al., Sticky Panels as Traps for *Musca autumnalis*, *Journal of Economic Entomology*, 70:5 p.549 (1977).

(List continued on next page.)

*Primary Examiner*—Kurt Rowan
(74) *Attorney, Agent, or Firm*—Bracewell & Patterson LLP

(57) ABSTRACT

An insect trap and a kit are provided for luring and retaining insects therein. The insect trap preferably includes a hollow housing having at least one opening therein and a hollow and enclosed cartridge member positioned in the housing and having at least one opening therein positionally aligned with the at least one opening of the housing so that insects may pass directly through the opening of the housing and into the cartridge member. Preferably, the combination of a lure and a retainer also is positioned within the cartridge member for luring and retaining insects within the cartridge member so that internal contents of the cartridge member can be sanitarily removed and disposed. A method for luring and retaining insects into a trap is also provided which preferably includes positioning a hollow cartridge member having an insect attractant positioned therein into a hollow housing and positionally aligning at least one opening in the cartridge member with at least one opening in the housing so that attracted insects pass directly into the cartridge member and do not have ready access between inner walls of the housing and outer walls of the cartridge member.

18 Claims, 4 Drawing Sheets

U.S. PATENT DOCUMENTS

| | | | |
|---|---|---|---|
| D271,231 S | 11/1983 | Stout | D22/19 |
| 4,490,938 A | 1/1985 | Baker | 43/114 |
| 4,577,434 A | 3/1986 | Davis | 43/115 |
| 4,709,503 A | 12/1987 | McQueen | 43/114 |
| 4,802,303 A | 2/1989 | Floyd, III | 43/131 |
| 4,930,251 A | 6/1990 | Crisanti | 43/107 |
| 4,947,578 A | 8/1990 | Anderson et al. | 43/131 |
| 5,048,224 A | 9/1991 | Frisch | 43/114 |
| 5,193,302 A * | 3/1993 | Rusco et al. | 43/107 |

OTHER PUBLICATIONS

Berry et al., Effects of Weather on Capture of Stable Flies (Diptera: Muscidae) by Alsynite Fiber Glass Traps, *Environ. Entomol.*, 15:3, p. 706 (1986).

Peterson et al., Trapping Technique for Male Face Flies, *Journal of Economic Entomology*, 71:1, p.40 (1978).

Rugg, Effectiveness of Williams Traps in Reducing the Numbers of Stable Flies (Diptera: Muscidae), *Journal of Economic Entomology*, 75:5, p. 857 (1982).

Williams, Sticky Traps for Sampling Populations of *Stomoxys calcitrans*, *Journal of Economic Entomology*, 66:8, p. 1279 (1973).

Musca Autumnalis, *Handbook of Insect Pheromones and Sex Attractants*, p. 604).

Brochure, Insect Inn™, *Paraclipse, © Inc.* (1994). ®1994.

Brochure, *Ants!*, Pest Control, Apr. 1995, ad, pullouts, *Bell Laboratories, Inc.*

Brochure, *The Tanglefoot© Company*.

Brochure, Stikem Special, *Seabright Laboratories*.

* cited by examiner

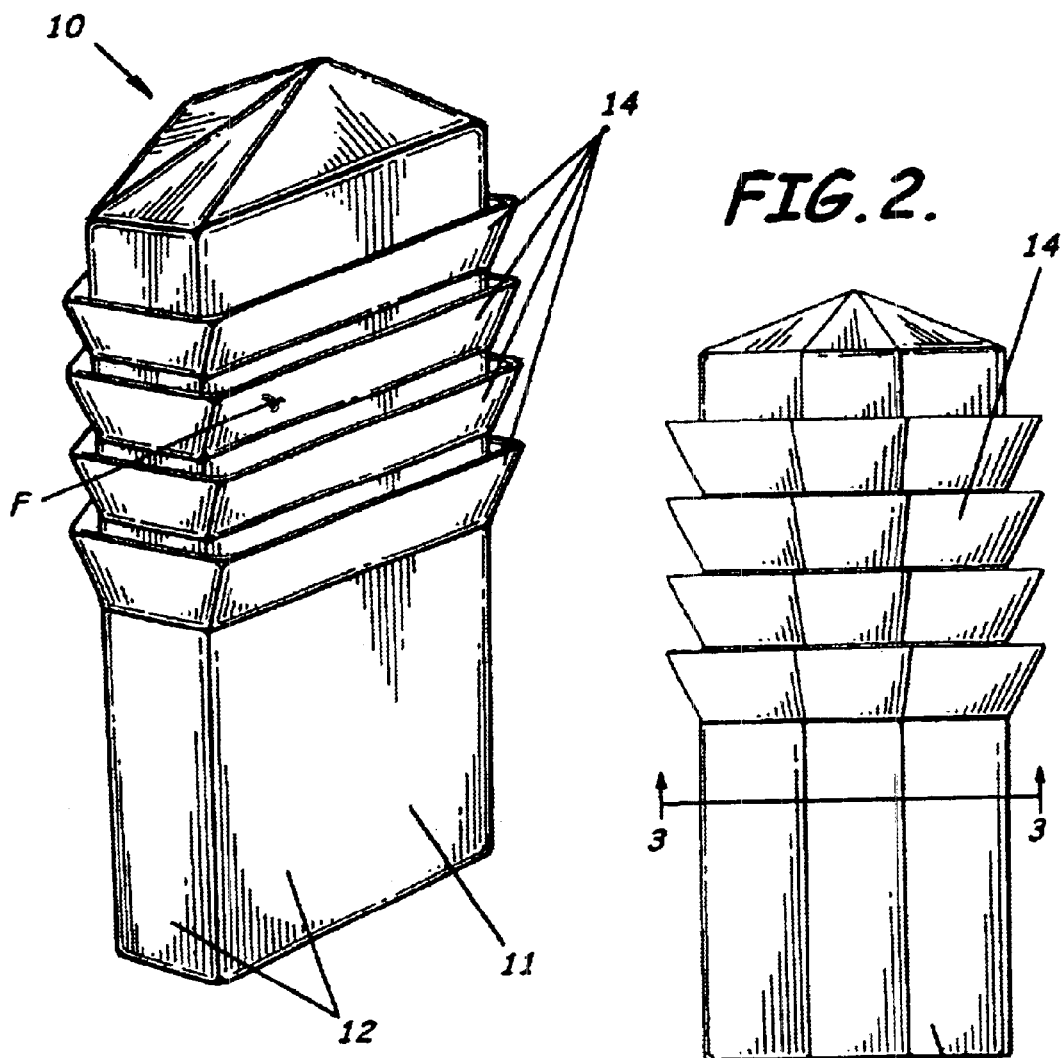
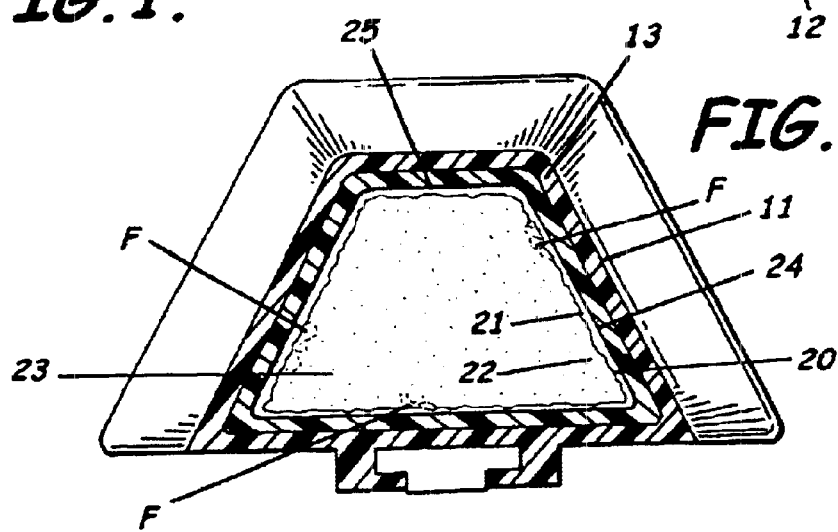

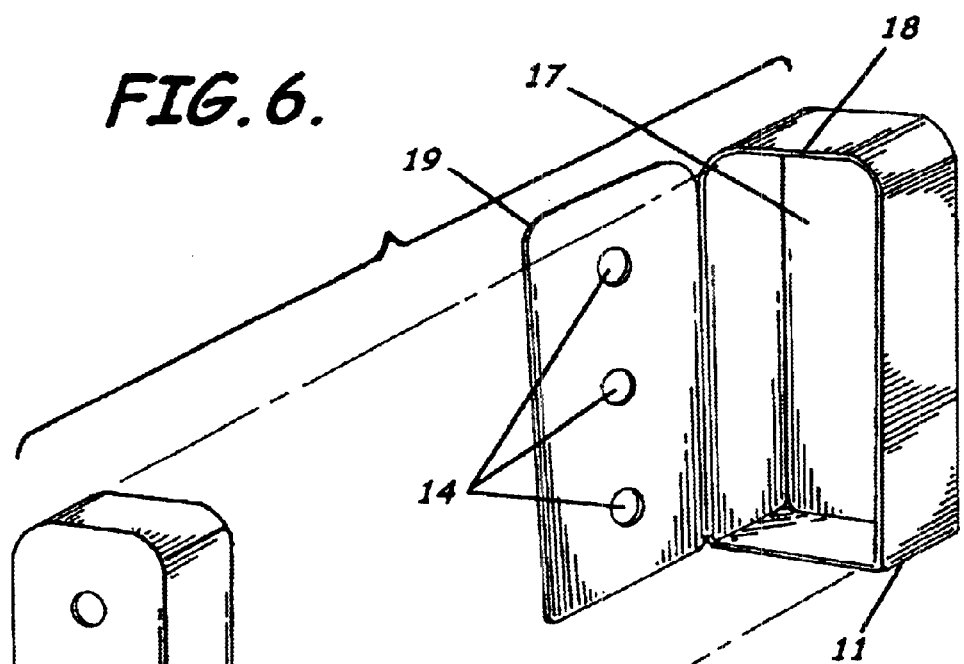
FIG.6.
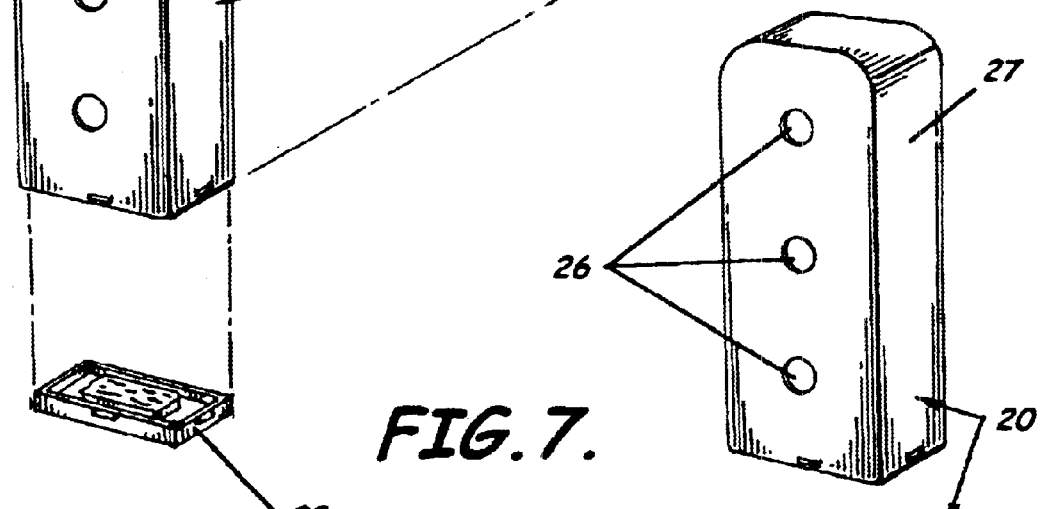
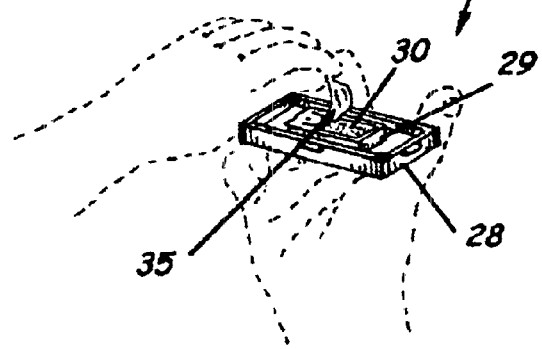
FIG.7.

DISPOSABLE INSECT TRAP, KIT, AND METHOD OF LURING AND RETAINING INSECTS THEREIN

FIELD OF THE INVENTION

This invention relates to a disposable insect trap and, more particularly, to an insect trap which has lure and retaining materials internally and thus can be sanitarily removed and disposed.

BACKGROUND OF THE INVENTION

In the home or in the food service, health care, or similar industries, various types of insects can be particularly troublesome. They are conventionally controlled by application of environmentally friendly or unfriendly insecticides or by poison baits, flypaper, fly strips, electronic bug "zappers," or insect traps.

Insect traps have conventionally come in a wide variety of configurations, some disposable, some with disposable components therein. Many of these insect traps generally use a combination of an adhesive and an attractant to trap insects such as illustrated in U.S. Pat. No. 3,708,908 by Levey titled *"Insect Trap."* These insect traps conventionally have a housing which holds an inner tubular structure. The inner tubular structure has a sticky exterior surface which traps the insects thereon. Because the insects are adhered to the outside of the inner tubular structure, any attempt to remove the inner structure from the trap would expose a person to decaying insect debris. Anyone in the vicinity when the removal is performed also would be exposed to an upsetting visual image. Additionally, without extremely careful handling, the decaying insect debris could actually contact the skin of the handler (and even other persons adjacent to the trap). These problems are especially acute in the commercial food industry where cleanliness and ambience are especially important to maintain both a sanitary and appealing atmosphere.

Other conventional insect traps may effectively kill the insects but fail to provide a is sanitary way to collect and dispose of the same. One example of alternatively configured insect traps which do not use an adhesive is illustrated in U.S. Pat. No. 4,802,303 by Floyd III titled *"Insect Trap."* These traps have an outer shell and an inner tube which are assembled in an open chimney configuration. The insects are attracted to the trap by a chemical positioned in the inner tube and then exposed to a poison on the exterior surface of the inner tube whereupon the dead insects fall to the ground. The trap exposes the trapping area to dropping insect carcas' which may be carriers of the poison as well as communicable diseases and further exposes people in the vicinity of the trap to offensive visual images. This type of trap is unsanitary and can be particularly inappropriate in food preparation and eating establishments as well as patient care settings.

Other insect traps have provided a cartridge which is removable and which traps the insect debris inhibiting the same from falling to the ground. As illustrated in U.S. Pat. No. 1,561,832 by Corsi et al titled *"Insect Trap,"* the core or cartridge has a viscous material on the outer surface to trap insects thereon and a perforated shield frame detached from and surrounding the core permitting bugs to enter the trap. The core is removable for reapplication of viscous materials onto the outer surface. The shield perforations, however, provide visual access to the dead insects by displaying the accumulation of the decaying insect debris on the exposed surface of the core. In addition, removal of the core for reapplication of the viscous material or for disposal exposes personnel to offensive visual contact as well as possible physical contact to the exposed and unprotected decaying insect debris and any chemicals present in the adhesive.

OBJECTS AND SUMMARY OF THE INVENTION

In view of the foregoing, it is therefore an object of the present invention to provide a trap for pests such as insects which is economical, portable, easy to manufacture, and which provides for sanitary removal and disposal of insects trapped therein.

It is also an object of the present invention to provide a trap, a kit, and methods for luring and retaining pests such as insects within the trap so that pests trapped within a disposable inner cartridge member can sanitarily be removed and another cartridge member can readily replace the disposed cartridge.

It is a further object of the present invention to provide an insect trap with a disposable cartridge member having a sanitary and aesthetic way to lure, retain, and dispose of insects.

The present invention provides many advantages one of which, for example, is that the lure and retaining means is preferably an environmentally friendly combination of scent attractants and adhesives. This eliminates the malodorous poison aroma conventionally associated with insecticides which is particularly advantageous in restaurant and health care settings. It is, however, feasible to use any number of insecticides or poisons in the present invention without affecting the aesthetic and sanitary protection provided by the present invention during use, removal, and disposal of at least portions of the insect trap.

More particularly, the present invention provides an insect trap for luring and retaining insects therein. The insect trap preferably includes a hollow housing having at least one opening therein. The insect trap also has a hollow and enclosed cartridge member positioned in the housing and having at least one opening therein positionally aligned with the at least one opening of the housing so that insects may pass directly through the opening of the housing and into the cartridge member. The trap also includes luring and retaining means positioned within the cartridge member for luring and retaining insects within the cartridge member so that internal contents of the cartridge member can be sanitarily removed and disposed. By luring and retaining pests such as insects within the interior of the enclosed cartridge member, a person can readily remove the cartridge member from the housing and dispose of it without touching or being exposed to the insect debris, the lure, and the retainer positioned within the cartridge member.

Because the insect trap reduces exposure to insect debris, insect contact along outer surfaces of the cartridge member, the lure, and the retainer, the more sanitary disposal reduces the risk of potential health problems associated with contact or exposure by a person disposing of and replacing the cartridge member.

The cavity of the cartridge member allows selected lures and attractants to be positioned either alone or in combination with retaining means therein and further provides a sanitary barrier for protection from physical and visual contact with the internal contents of the cavity during use, removal, disposal, and replacement of the cartridge member. In addition, the housing can include either alone or in combination, a light source, alsynite panels or other materials, light reflecting colors, and increased surface area to improve insect attraction to the target insect trap.

Another advantage of the present invention, for example, is that the cartridge member is configured to allow a lure to be positioned in a container therein. The container is preferably readily accessible through a detachable or openable portion of the cartridge member and sealed to prolong shelf life of a lure by preventing activation during shipping and storage. As such, a lure can be prepackaged in a variety of preselected chemical compositions which address the customer's needs. For example, the composition of the lure can vary and be interchanged or preselected depending on the seasonal requirements or the predominant species of insects in the user environment. The user merely removes the seal and inserts the container into the cartridge member. Of course, the container could also be an integral part of the cartridge member itself. Either way, the content of the container can vary depending on need.

Additionally, the present invention provides a kit for luring and retaining insects into a trap, the kit preferably includes a hollow and enclosed cartridge member having at least one opening therein and a hollow housing for receiving said hollow cartridge member therein. The housing preferably has at least one opening therein for positionally aligning with the at least one opening of the cartridge member so that insects may pass directly through the opening of the housing and into the cartridge member. The kit also includes luring and retaining means adapted to be positioned within the cartridge member for luring and retaining insects within the cartridge member so that internal contents of the cartridge member can be sanitarily removed and disposed.

Additionally, the insect trap kit advantageously provides a flexible and individually tailored way to match up customer requirements while minimizing costs by allowing the kit to be ordered so as to allow a customer a choice of a variety of lures in sealed containers. Upon receipt, the customer can activate the lure by removing the seal and placing the container in the cartridge through the easy opening portion of the cartridge member. The user then merely slides or places the cartridge member into the housing. The positional alignment of the cartridge member relative to the housing allows easy insertion of the cartridge member by opening the moveable portion of the housing and slidably inserting the cartridge member therein. This allows easy removal and disposal of the used cartridge member, and also easy replacement of a new cartridge member all the while allowing the housing to remain fixably mounted.

The present invention further provides a method for luring and retaining insects into a trap. The method preferably includes positioning a hollow cartridge member having an insect attractant positioned therein into a hollow housing and positionally aligning at least one opening in the cartridge member with at least one opening in the housing so that attracted insects pass directly into the cartridge member and do not have ready access between inner walls of the housing and outer walls of the cartridge member. Accordingly, this method provides an effective, sanitary, and cost effective way to trap and lure insects. The insect trap lures and traps the attracted insects into the cavity of the cartridge member thereby protecting the user from unsanitary and unsightly contact with the decaying insect debris and chemicals contained therein.

BRIEF DESCRIPTION OF THE DRAWINGS

Other objects and advantages will appear as the description proceeds when taken in connection with the accompanying drawings, in which:

FIG. 1 illustrates a left side perspective view of an insect trap according to a first embodiment of the present invention;

FIG. 2 illustrates a front perspective view of an insect trap according to the first embodiment of the present invention;

FIG. 3 illustrates a transverse sectional view taken along line 3—3 of FIG. 2;

FIG. 6 illustrates an exploded perspective view of a second embodiment of an insect trap, kit, and method according to the present invention;

FIG. 7 illustrates an exploded perspective view of a seal detachably connected to the lower end portion of a cartridge member for protecting the lure thereon according to the present invention.

DETAILED DESCRIPTION

Figure 4:
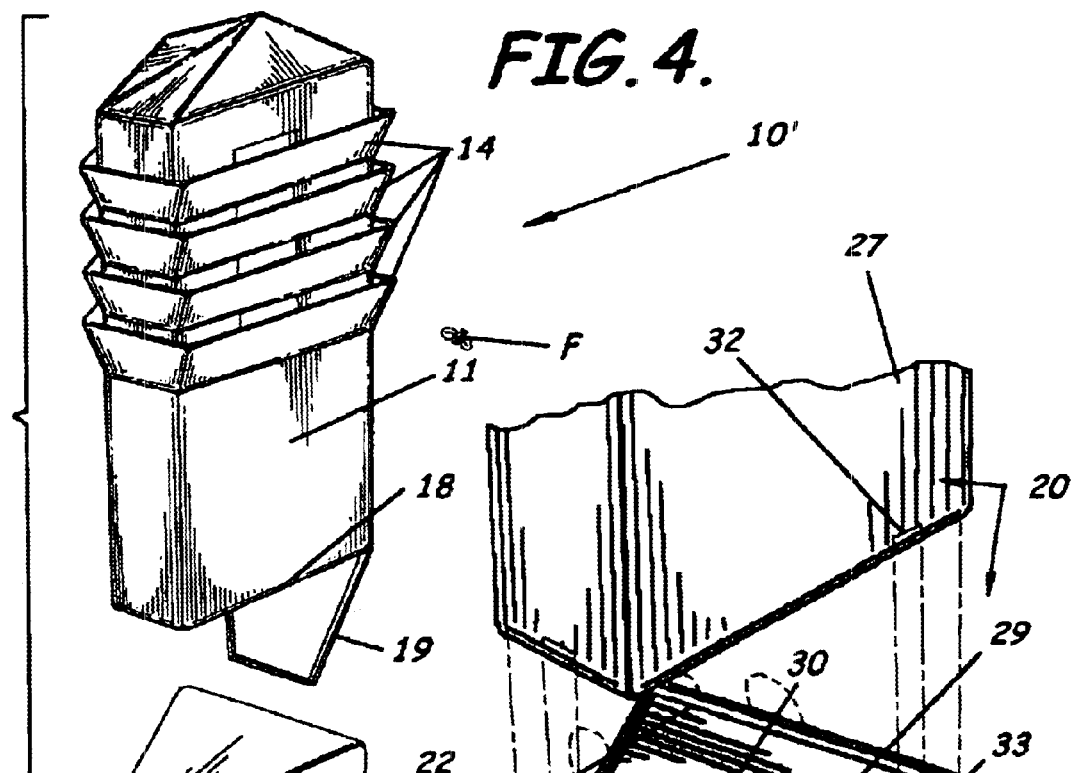
FIG. 4 illustrates an exploded perspective view of an insect trap kit and method according to a first embodiment of present invention.

The present invention now will be described more fully hereinafter with reference to the accompanying drawings in which preferred embodiments of the invention are shown. This invention may, however, be embodied in many different forms and should not be construed as limited to the illustrated embodiments set forth herein; rather, these illustrated embodiments are provided so that this disclosure will be thorough and complete and will fully convey the scope of the invention to those skilled in the art. Like numbers refer to like elements throughout.

Generally described, the insect trap 10 of the present invention lures insects and other pests to the trap with a scent attractant. An insect such as a fly F, in search of the attractant, enters the trap 10 (see FIGS. 1, 6, and 8) through one of at least one opening 14, and preferably a plurality of openings 14 as illustrated, in a housing 11 and immediately continues through an adjacent and aligned opening 26 in a cartridge member 20 (see FIGS. 4, 6, and 8). The insect is trapped on one of the inner walls 21 of the cartridge member 20 by an adhesive coating 22 positioned thereon. Because the cartridge member 20 preferably is an enclosed hollow structure which traps the insects therein, the insect debris is hidden in the cavity 23 of the cartridge member 20. Upon removal, the person removing the cartridge member 20 is free to grasp the outer walls or surfaces 24 of the cartridge member 20 without fear of visual or physical contact with the decaying insects.

Turning more particularly now to the specifics of the invention, as best illustrated in FIGS. 1–4, the insect trap 10 includes an enclosed cartridge member 20 which is positioned in a hollow housing 11 with closely aligned openings 14, 26. The attracted insects enter into the opening(s) 14 in the housing 11 and advance directly into the cartridge member 20 through the aligned opening(s) 26 in the cartridge member 20. The closely positioned openings 14, 26 prevent insects including, but not limited to, fruit flies, white flies, house flies, wasps, mosquitoes, bees, winged aphids, and other types of pests from getting lodged between the outer walls 24 of the cartridge member 20 and the inner walls 13 of the housing 11. Once the insect enters the cartridge member 20, the adhesive 22 on the inner walls 21 of the cartridge member 20 retains the insects in the internal cavity 23 of the cartridge member 20.

Figure 8:
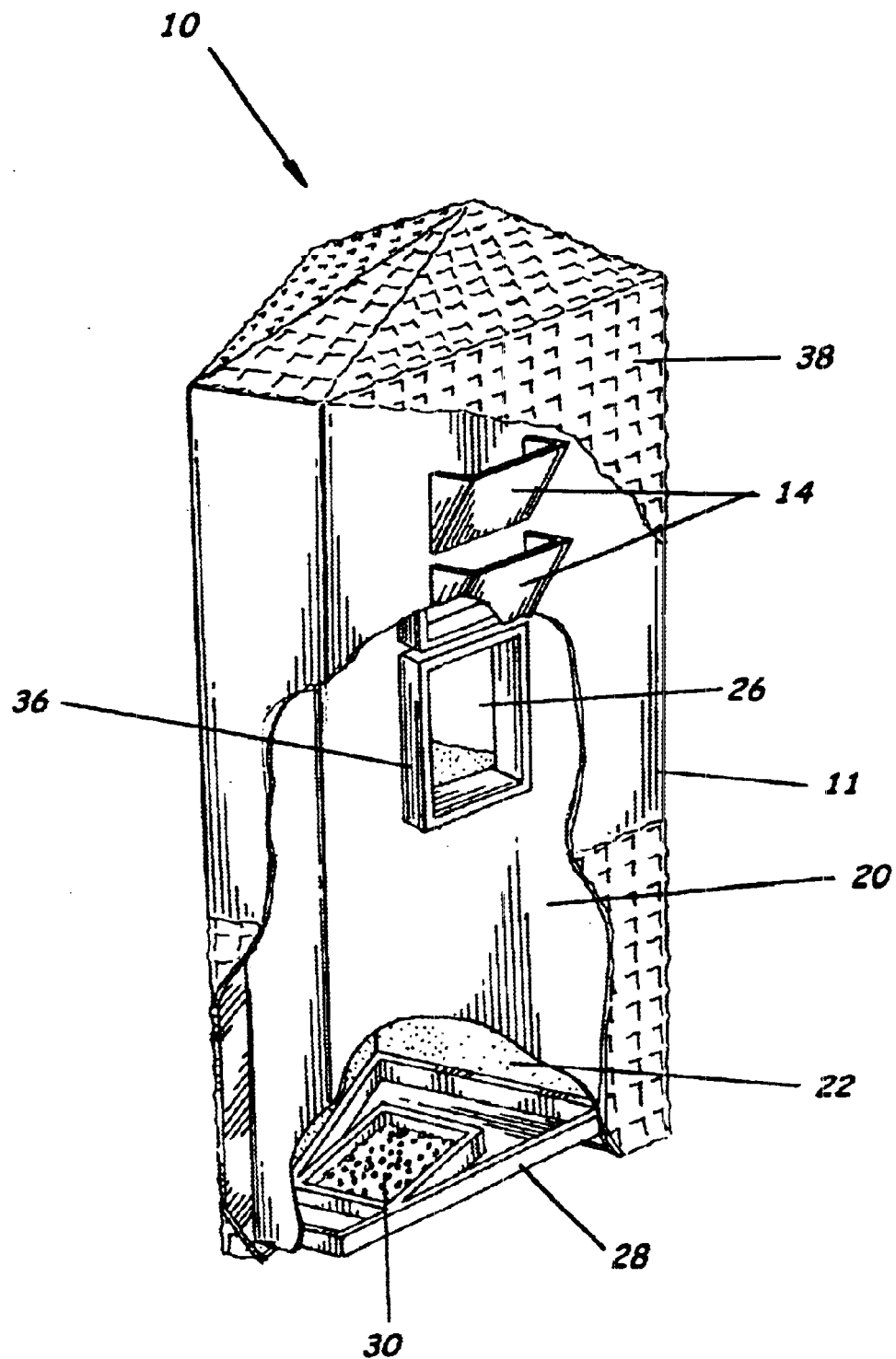
FIG. 8 illustrates a fragmentary perspective view of an insect trap according to a third embodiment of the present invention.

The respective closely positioned and aligned housing and cartridge member openings 14, 26 can be present in any number of positions, sizes, and configurations and still meet the intent of the present invention. For example, the embodiment of FIG. 1 illustrates several openings 14 positioned in an outer surface 12 of the hollow housing 11, and the embodiment of FIG. 2 illustrates that the opening(s) 14 can be positioned in more than one surface of the housing 11. More specifically, FIGS. 1 and 2 illustrate the housing 11 with eight openings in two different surfaces 14. The housing 11 could have any number of opening(s) 14 (see first, second, and third embodiments illustrated in FIGS. 1, 6, 8), typically 1, 2, 3, or more, positioned in any number of faces and still meet the intent of the present invention. It is also possible to have many varied quantity combinations of aligned housing opening(s) 14 relative to the cartridge member opening(s) 26. FIG. 1 illustrates one opening 26 in the cartridge member 20 aligned with four openings 14 in the housing 11. FIG. 6 shows three openings 26 in the cartridge member 20 which are aligned with a corresponding three openings 14 in the housing 11. FIG. 8 illustrates another of the many possible combinations, three openings 14 in the housing 11 aligning with two openings 26 in the cartridge member 20.

In addition, it is noted that the insect trap 10 (including the housing 11 and corresponding cartridge member 20) can be formed in any number of shapes and made from any number of materials and meet the intent of the present invention. The blunt wedge shaped housing 11 illustrated in FIGS. 1 and 3 has a large surface area and therefore provides a large insect attractant target. Other housing shapes including but not limited to cylindrical, polygonal, pyramidal, square, rectangular (see FIGS. 6, 7), conical, and the like, however, would also be viable shapes for the housing 11. Additional features may also be added to the pest trap to enhance its attractiveness (both to the human eye and the pest).

As best illustrated in FIG. 8, certain optical enhancements in an external panel or housing 11 of an insect trap can increase the attraction potential of an insect trap to insects. Examples of features which enhance the attraction are certain materials colors, shapes, and light (reflection/brightness). For example, in *Effectiveness of Williams Traps in Reducing the Numbers of Stable Flies* (Diptera: Muscidae), 75 Journal of Economic Entomology no.5, 857–859 (1982), the author (D. Rugg) discusses the attractive quality of translucent fiber glass panels. Another example is given by L. G. Pickens et al. in *Sticky Panels as Traps for Musca autuinnalis*, 70 Journal of Economic Entomology no. 5, 549–552 (1977), where the authors compare and evaluate materials, colors, shapes, sizes, placement, and orientation of outdoor traps. The above referenced articles are hereby incorporated herein by reference into this application.

FIG. 8, a third embodiment of the present invention, best illustrates a housing 11 with enhanced optical features. The housing 11 has a light enhancing textured surface 38 which increases the reflection characteristics of the insect trap 10. The enhanced reflection surface(s) can be added to the housing 11 as a way to attract an increased number of insects. Although FIG. 8 illustrates the light enhancing surface as positioned on and contacting most of the exterior surface, the enhancement can be positioned in an almost unlimited number of ways, for example as separate discrete segments or integrated portions of the housing 11 and still serve to improve the attraction of the trap to insects. The optical enhancements preferably act with a lure or attractant positioned in the cartridge member 20 cavity 23. Additional optical enhancing features include but are not limited to adding a light chamber to the trap, using Alsynite or styrofoam materials, as well as using reflecting or translucent colors or textured surfaces, and using shapes which provide increased surface area. The light chamber can be positioned in any number of ways including being positioned over an outside portion of the outer periphery of the housing 11, in a separate compartment positioned outside but adjacent the cartridge member 20, or in a separate chamber inside the housing 11. The light source would generate externally visible light to increase the number of insects which are attracted to the insect trap 10.

Placing the trap 10 in a well lit area may also serve to attract the insects to a light reflecting surface. Therefore, the present invention does not limit the way in which the insect trap 10 can be mounted. There are a number of well known mounting techniques which allow mounting to a wall or planar horizontal or vertical or even angular surface. In addition, the trap can be suspended or positioned on an object (such as a table or stove top) as needs or application dictate. As described above, any number of optical enhancing features and mounting techniques may be incorporated into and positioned on the insect trap 10 either alone or in combination and still meet the spirit of the present invention.

In addition, the housing 11 heretofore has been described as hollow but, in keeping with the present invention, the housing 11 may be only partially hollow. The hollow element of the housing 11 provides a chamber 17, as best illustrated in FIG. 6, which encloses a closely adjacent and aligned cartridge member 20. Thus, any number of variations from this theme will fit within the scope of the present invention including but not limited to a housing 11 which includes an adjacent chamber positioned in the housing for enclosing an internal light source or the like separate from the chamber 17 which encloses the cartridge member 20 to attract increased numbers of insects while maintaining the integrity of the sanitary protective barrier to the luring and trapping means positioned in the cavity 23 of the cartridge member 20.

The alignment of the housing opening(s) 14 with the cartridge member 20 opening(s) 26 is important in order to minimize the possibility that insects are trapped in the corridor 25 or space between the housing inner walls 13 and the outer walls 24 of the cartridge member 20. One alignment of the housing 11 and the cartridge member 20 is as illustrated in FIG. 3. The outer walls 24 of the cartridge member 20 are positioned closely adjacent the inner walls 13 of the housing 11 so that an insect passing through at least one opening 14 of the housing 11 does not have ready access between the inner walls 13 of the housing 11 and the outer walls 24 of the cartridge member 20.

In an alternative alignment, the cartridge member 20 can be made smaller than the housing 11 and still maintain the integrity of the passageway between the positionally aligned openings 14, 26 as illustrated in FIG. 8. The cartridge member 20 has at least one duct 36 extending outwardly therefrom. The duct(s) 36 is positioned over the opening(s) 26 of the cartridge member 20 and is aligned with the opening(s) 14 in the housing 11. This embodiment allows the cartridge member 20 to be smaller than the cartridge member 20 of the embodiments described above while also maintaining the fit and alignment of the duct 36 to the positionally aligned openings 14, 26. The duct 36 is positioned closely adjacent the inner wall 13 of the housing 11 which in keeping with the present invention denies the insects ready access to the outer walls 24 of the cartridge member 20 and the inner walls 13 of the housing 11. This also allows the housing 11 to integrate a separate chamber inside the housing 11 to enclose a potential light source, which as described above increases insect attraction potential while also minimizing housing 11 size because the separate chamber can be fit into the housing 11 because the duct(s) 36 allows the cartridge member 20 to be smaller than the housing 11.

As described above, the cartridge member 20 holds a lure and retaining means in the interior cavity 23 for attracting and retaining the insects therein. Providing the lure and retaining means in the interior cavity 23 minimizes unpleasant and offensive physical and visual contact with the lure and retaining means 22 as well as with the trapped and decaying insects. This also allows for sanitary removal, disposal, and replacement of the cartridge member 20 from the housing 11.

Insect lure and retaining means are generally known. Lures, for example, include baits, scent attractants, sugars, and the like while retaining means, for example, include adhesives, insecticides, poisons, or particular arrangements which inhibit insect departure. In a preferred embodiment of the present invention, the lure (see FIG. 3 et seq.) 30 is a scent attractant, which preferably includes a sex pheromone. The sex pheromone for most commonly found insects are generally known. See e.g., M. S. Mayer and J. R. McLaughlan, *CRC Handbook of Insect Pheromone* and *Sex Attractants*, CRC Press, Inc., Boca Raton, Fla. (1990). Scent attractants are also commercially available, one example being the product Musca-Cide™. The retaining means is preferably an environmentally friendly non-toxic adhesive, tacky tape, or the like which is placed on portions of the inner walls 21 of the cartridge member 20. Commercially available adhesives and glue traps include, Tree Tangle foot® Pest Barrier, Tanglefoot® Tangle-Trap Insect Trap Coating, Seabright™ Stikem Special, and Eaton® STICK-EM® glue traps. The adhesive 22 is positioned on at least one inner wall 21, and preferably positioned on all the inner walls 21 of the cartridge member 20, but also can be a sticky board or trap positioned in the cavity 23 of the cartridge member 20 or combinations thereof.

Additional variations of a retaining means include the use of an adhesive 22 in combination with an insecticide or poison, or just the use of the insecticide or poison to retain the insects on the inside of the cartridge member 20. The adhesive 22 may be applied as a continuous coating on the inner walls 21 of the cartridge, but can also be applied to the bottom or top surfaces. Obviously, the adhesive 22 can also be applied in discrete segments on the cartridge inner walls 21. In yet another alternative, the adhesive can be applied to panels as on conventionally known panel traps described above which are then incorporated into the interior of the cartridge member 20.

In a preferred adhesive application, the sticky substance or adhesive is not placed on the inner wall 21 area immediately adjacent the alignment opening(s) 26 of the cartridge member 20 so as to prevent blockage and buildup of insects in the passage into the cartridge member 20. The adhesive 22 or sticky substance, however, can be placed on the inner wall 21 in this area without affecting the scope of the present invention.

In a first embodiment of the present invention, as illustrated in FIGS. 1–3, the lure 30 or attractant such as a sex pheromone or the like can be integrated and combined with an adhesive 22 and applied together on the surface of the inner walls 21 of the cartridge member 20. This alternative can provide an attractant in lieu of or in combination with the separately contained lure as described above. If used to replace a lure in a container 29, this integration can also eliminate the need for additional components such as a sealed container 29. Because the attractant is preapplied with the adhesive to at least a portion of the inner walls 21 of the cartridge member 20, it may be desirable to prolong the shelf life of the attractant. It is therefore preferable, although not necessary, that the cartridge member 20 be enclosed and sealed in a plastic type wrap or equivalent to prevent activation of the attractant embedded in the adhesive during shipping and storage.

The components of the insect trap can be assembled and disassembled in easy order. For example, FIG. 4 illustrates an exploded view of the parts and their respective assembly into an insect trap according to a second embodiment of the present invention. The lure 30 is contained in a container 29 positioned on a detachable bottom 28 of the cartridge member 20. The detachable bottom 28 is then readily reattached to the cartridge member 20. The outer walls 24 of the cartridge member 20 are shaped to be received in and closely aligned with the housing 11 and its respective inner walls 13.

The housing 11 has an openable or detachable first portion 19 and a stationary second portion 18. The cartridge member 20 is insertable into the housing through the opening provided by the openable first portion 19. The opening(s) 14 in the housing 11 is closely aligned with the opening(s) 26 in the cartridge member 20 so that insects pass directly into the cartridge member 20 opening(s) 26 from the opening 14 in the housing 11.

In an embodiment of the insect trap 10' as illustrated in FIG. 4, an openable first portion 19 positioned at the bottom of the housing 11 wherein the cartridge member 20 is supported by or rests on the openable first portion 19 when the cartridge member 20 has been inserted and the openable first portion 19 has been closed. FIG. 6 illustrates an additional embodiment with an openable first portion 19 at the front of the housing 11 whereby the cartridge member 20 is inserted into the housing 11 through the front openable portion 19 and rests upon the stationary bottom of the housing 11. The openable element 19 can be connected to the housing second portion 18 in any number of ways, preferably by a hinge such as a living hinge, or an integral connection which pivots open and the like. In addition, the openable first portion 19 can also be detachable and perform in an equivalent manner according to the present invention. There are any number of functional placements of the openable or detachable first portion 19 of the housing 11 although the bottom, front, or top of the housing 11 is preferred for easier alignment of the positionally aligned opening(s) 14 and 26. In any event, the openable first portion 19 provides ready access to assemble the cartridge member 20 into the housing 11 and for removal and replacement therefrom. This feature also provides an easy to assemble kit for a purchaser or user.

Figure 5:
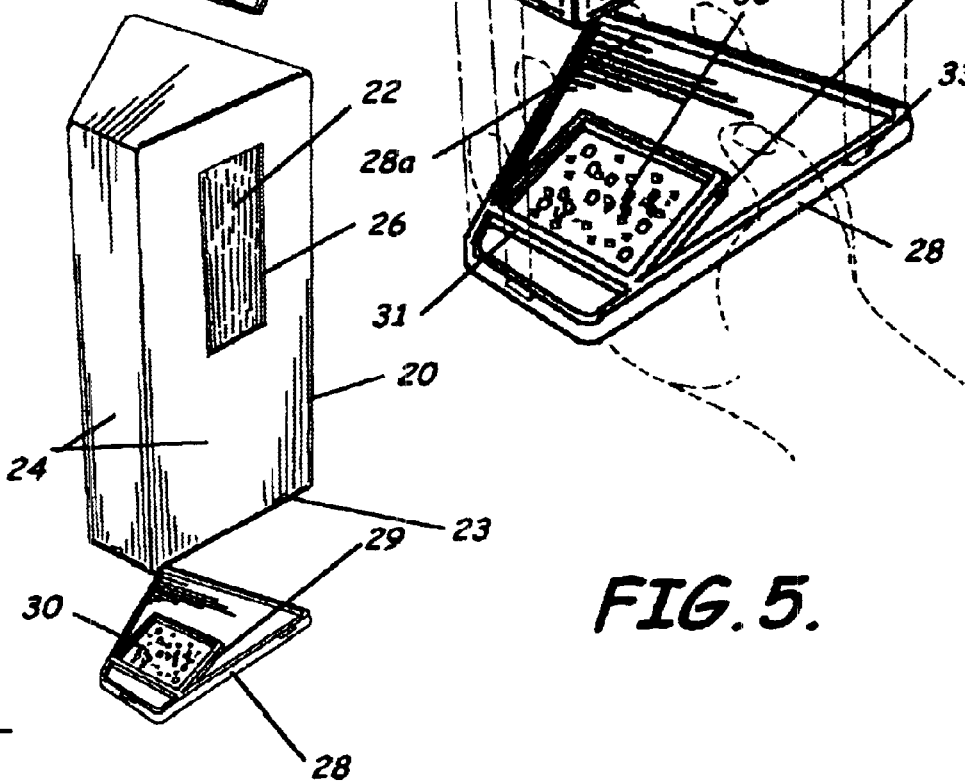
FIG. 5 illustrates an exploded fragmentary view of a cartridge member having a detachable lower end portion and a container with lure positioned therein according to a first embodiment of the present invention.

FIG. 5 illustrates a removable cartridge member 20 with a granulated lure 30 which is placed in a container 29 in a detachable section 28 (shown here as a lower end portion) of the cartridge member 20. The detachable portion 28 as shown includes outwardly extending flanges 33 integrally connected to side peripheries 28a of the detachable bottom 28 that are receivable in opening 32 in the second portion 27 of the cartridge member 20 for securing the detachable bottom 28 to the cartridge member 20. Obviously this configuration can be reversed with functional equivalency. In addition, like the housing 11, any number of known attachment techniques such as Velcro®, interference fits, screws, and even adhesives would also provide acceptable fastening. It is also noted that, like the housing 11, the detachable feature can be merely an openable feature such as a hinge which pivots to allow access or a sliding engagement mechanism which allows access to the bottom by sliding the bottom down or over, or the like. The detachable portion 28 of the cartridge member 20 needs only to be attached to the second portion 27 one time because the cartridge member 20 preferably is disposed after use and therefore the fastening technique does not have to be reversible.

The container 29 can be a separate item that can be placed in the cartridge member 20 or preferably can be integrally formed on the detachable section 28. It is preferred that the container 29 be sealable to preserve the shelf life by preventing activation of a lure 30. In one alternative, the container 29 as illustrated in FIG. 5 is secured to an end of the cartridge member 20. The container 29 has an upstanding ridge 31 which has a flat upper surface which is sealable. FIG. 7 illustrates a seal 35 being detached from the container 29.

As discussed above, the seal 35 extends shelf life of the lure by delaying activation and exposure of the attractant to the environment, although the seal 35 is preferably used, it is not required. In addition, it should be noted that it is also possible to use a generally known bait type lure which does not require a container 29 and which can also be used to lure insects according to the present invention. The bait may be formed in a solid elongated mass and is positioned within the cartridge member 20 and does not require a separate sealable container 29 to hold it therein.

Also, although preferred, the cartridge member 20 does not require a detachable or openable bottom section 28. The cartridge member 20 could be manufactured as an integral unit by assembling in the necessary components and still function according to the present invention. This may be particularly appropriate where the adhesive and lure are combined and applied to the surface of the inner walls 21 of the cartridge member 20. Likewise, the placement of the openable or detachable portion 28 of the cartridge member 20 can be altered (i.e., to the top or side) and still be within the scope of the present invention.

A further aspect of the invention includes an insect trap which can be made as a kit. The kit, as best illustrated by FIG. 6, preferably includes a container 29 which is shown here formed on a detachable bottom portion 28 of the cartridge member 20. The container is supplied with a lure 30 material such as a sex pheromone typically in granular form. The lure can vary depending upon seasonal and pest requirements. The lure 30 material is sealed in the container 29 with a detachable seal 35 covering. The housing 11 and the cartridge member 20 with a pre-applied retaining adhesive 22 on its inner walls 21 are likewise provided as part of the kit. The kit is thus able to be shipped or stored ready for activation, assembly, and use.

To assemble and activate the trap 10, one merely removes the seal 35 from the container 29 and attaches the first or bottom portion 28 onto the second portion 27 of the cartridge member 20. The openable first portion 19 of the housing 11 is opened away from the stationary second portion 18 of the housing 11. The cartridge member 20 is subsequently easily inserted into the housing 11 and the openable first portion 19 of the housing 11 is then closed. The positionally aligned openings 14, 26 are thus aligned and the gap is correspondingly fitted to minimize the gap between the outer wall 24 of the cartridge member 20 and the inner wall 13 of the housing 11 to insure that the insects do not have ready access to the inner walls 13 of the housing 11 and the outer walls 24 of the cartridge member 20. When the cartridge member 20 needs to be replaced, the housing 11 openable first portion 19 is opened and the cartridge member 20 is removed out through the opening. The lure and retaining means as well as the insect remains are contained in the cavity 23 of the cartridge member 20. As such, the internal contents are not readily contacted either visually or physically and the cartridge member 20 can therefore be sanitarily removed and disposed. A new cartridge member 20 can be activated and inserted into the housing 11 as described hereinabove.

As described above, for example, a first embodiment does not require an openable cartridge member 20 because the adhesive and lure can be integrated and preapplied to the surface of the inner walls 21. Therefore, according to this embodiment the kit and its associated assembly technique is made even simpler. One merely removes any protective packaging or seals from the cartridge member 20, opens the housing 11 openable first portion 19, slides in the cartridge member 20, and closes the openable first portion 19. Removal of the expired or used cartridge member 20 just reverses the process described above.

As illustrated in FIGS. 1–8, the present invention also includes a method of luring and retaining insects into a trap 10. The method preferably includes positioning a hollow cartridge member 20 having an insect attractant 30 positioned therein into a hollow housing 11 and positionally aligning at least one opening 26 in the cartridge member 20 with at least one opening 14 in the housing 11 so that attracted insects pass directly into the cartridge member 20 and do not have ready access between inner walls 13 of the housing 11 and outer walls 12 of the cartridge member 20. The cartridge member 20 is preferably enclosed and hollow so as to reduce physical and visual contact with internal contents therein, and the method further includes removing the enclosed and hollow cartridge member 20 from the housing 11 and disposing of the cartridge member 20 without contacting the internal contents thereof.

Additionally, another method of luring and retaining insects into a trap 10 is provided by the present invention which preferably includes positioning an insect attractant 30 (see FIG. 3, 22) within a hollow cartridge member 20, positioning the hollow cartridge member 20 having the insect attractant 30, 22 positioned therein into a hollow housing 11, and positionally aligning at least one opening 26 in the cartridge member 20 with at least one opening 14 in the housing 11 so that attracted insects pass directly into the cartridge member 20 and do not have ready access between inner walls 13 of the housing 11 and outer walls 24 of the cartridge member 20. The cartridge member 20 preferably is an enclosed and hollow cartridge member 20 so as to reduce physical and visual contact with internal contents therein and includes first 28 and second portions 27 so that the step of positioning an attractant within the cartridge member 20 includes positioning the attractant 30, 22 within the first portion of the cartridge member 28 and attaching the first portion 28 of the cartridge member 20 to the second portion 27 thereof so that the attractant 30, 22 is positioned within the enclosed and hollow cartridge member 20. The enclosed and hollow cartridge member 20 can then be removed from the housing 11 and disposed of without contacting the internal contents of the cartridge member 20.

In the drawings and specification, there have been disclosed typical preferred embodiments of the invention, and, although specific terms are employed, these terms are used in a descriptive sense only and not for purposes of limitation. The invention has been described in considerable detail with specific reference to various illustrated embodiments. It will be apparent, however, that various modifications and changes can be made within the spirit and scope of the invention as described in the foregoing specification and defined in the appended claims.

That which is claimed:

1. An insect trap for luring and retaining insects therein, the insect trap comprising:

a hollow housing having at least one opening therein;

a hollow and enclosed cartridge member totally positioned within said housing and having at least one opening therein positionally aligned with the at least one opening of said housing so that insects may pass first directly through the at least one opening of said housing prior to entering into any opening in the cartridge member and then into the at least one opening of said cartridge member and do not have ready access between inner walls of the housing and outer walls of the cartridge member; and luring and retaining means positioned within said cartridge member for luring and retaining insects within said cartridge member so that internal contents of said cartridge member can be sanitarily removed from said housing and disposed.

2. An insect trap as defined in claim 1, wherein outer walls of said cartridge member are positioned closely adjacent inner walls of said housing so that an insect passing through the at least one opening of said housing does not have ready access between the inner walls of said housing and the outer walls of said cartridge member, and wherein the enclosed cartridge member is enclosed such as to block ready viewing of and contact with insects trapped therein upon removal of the enclosed cartridge member from the housing by a user.

3. An insect trap as defined in claim 1, wherein said hollow housing further has first and second portions, said first portion of said housing being detachably connected to said second portion thereof to provide access into said hollow housing for readily inserting said cartridge into and readily removing said cartridge from said hollow housing.

4. An insect trap as defined in claim 1, wherein said lure and retaining means includes an adhesive material positioned along inner walls of said cartridge member and a scent attractant positioned within said cartridge member.

5. An insect trap as defined in claim 1, wherein said luring and retaining means comprises:

a lure which is an attractant to insects, the lure being positioned in a sealable container for preserving the shelf life thereof and positioned within said cartridge member; and an adhesive positioned on at least portions of at least one inner wall of said cartridge member for retaining insects within said cartridge member.

6. An insect trap as defined in claim 5, further comprising lure holding means for holding the lure within said cartridge member, said lure holding means including:

a container secured to an end of said cartridge member, said container including at least a bottom and an upstanding ridge surrounding said bottom, a lure positioned on said bottom, and a seal detachably connected to said upstanding ridge to preserve lure shelf life.

7. An insect trap as defined in claim 5 wherein the lure comprises a sex pheromone, wherein the at least one opening of the housing comprises a plurality of openings, and wherein the housing further comprises a plurality of spaced-apart and upwardly extending ducts positioned along an outer surface thereof and each positioned closely adjacent one of the plurality of openings.

8. An insect trap for luring and retaining insects therein, the insect trap comprising:

a hollow housing having at least one opening therein;

a hollow and enclosed cartridge member totally positioned within said housing and having at least one opening therein, wherein the at least one opening of said cartridge member is positionally aligned with the at least one opening of said housing so that insects may pass first directly through the at least one opening of said housing prior to entering into any opening in the cartridge member and then into the at least one opening of said cartridge member and do not have ready access between inner walls of the housing and outer walls of the cartridge member, and wherein said housing including first and second portions, said first portion of said housing being detachably connected to said second portion thereof to provide access into said hollow housing for inserting said cartridge member into and removing said cartridge member from said hollow housing so that internal contacts of said cartridge member can be sanitarily removed from said housing and disposed;

an attractant positioned inside of said cartridge member for attracting said insects; and An adhesive material positioned on portions of at least one inner wall of said cartridge member for retaining said insects.

9. An insect trap as defined in claim 8, wherein outer walls of said cartridge member are positioned closely adjacent inner walls of said housing so that an insect passing through the at least one opening of said housing does not have ready access between the inner walls of said housing and the outer walls of said cartridge member, and wherein the enclosed cartridge member is enclosed such as to block ready viewing of and contact with insects trapped therein upon removal of the enclosed cartridge member from the housing by a user.

10. An insect trap as defined in claim 9, wherein said first portion of said housing includes a detachable bottom end portion thereby providing access into said hollow housing when said bottom end portion is in an operatively open position, and wherein said cartridge member is supported by said bottom end portion of said housing when said bottom end portion is in an operatively closed position, and wherein said cartridge member is readily removable from said bottom end portion of said housing when said bottom end portion is in an operatively open position and configured so that the internal contents of said cartridge member are not readily visually accessible.

11. An insect trap as defined in claim 10, further comprising lure holding means for holding said lure inside a lower end portion of said cartridge, said lure holding means including:

a container integrally formed in a lower end portion of said cartridge member, said lower end portion of said cartridge member being detachably connected to remaining portions of said cartridge member, said container including at least a bottom and an upstanding ridge surrounding said bottom, a lure positioned on said bottom, and a seal detachably connected to said upstanding ridge to preserve lure shelf life.

12. An insect trap as defined in claim 10, wherein the at least one housing opening and the at least one cartridge member opening are coaxially aligned.

13. A kit for luring and retaining insects into a trap, the kit comprising:

a hollow and enclosed cartridge member having at least one opening therein, the enclosed cartridge member being enclosed so as to block ready viewing of and contact with insects trapped therein upon removal of the enclosed cartridge member from the housing by a user;

a hollow housing for receiving and totally enclosing said hollow cartridge member therein, said housing having at least one opening therein for positionally aligning with the at least one opening of said cartridge member so that insects may pass first directly through the at least one opening of said housing prior to entering into any opening in the cartridge member and then into the at least one opening of said cartridge member and do not have ready access between inner walls of the housing and outer walls of the cartridge member; and luring and retaining means positionable within said cartridge member for luring and retaining insects within said cartridge member so that internal contents of said cartridge member can be sanitarily removed and disposed.

14. A kit as defined in claim 13, wherein said luring and retaining means comprises:

a lure which is an attractant to insects, wherein said lure is placed in a sealed container prior to activation and insertion into the insect trap for preserving shelf life of said attractant and wherein said seal is removable from said container to activate said attractant; and an adhesive positioned on inner walls of said cartridge for retaining said insects within said cartridge.

15. A kit as defined in claim 14, further comprising lure holding means for holding the lure inside a lower end portion of said cartridge member, said lure holding means including:

a container integrally formed in a lower end portion of said cartridge member, said lower end portion of said cartridge member being positioned for detachably connecting to remaining portions of said cartridge member, said container including at least a bottom and an upstanding ridge surrounding said bottom, a lure positioned on said bottom, and a seal detachably connected to said upstanding ridge to preserve lure shelf life.

16. A method for luring and retaining insects into a trap, comprising:

positioning an insect attractant within a hollow and enclosed cartridge member;

positioning the hollow and enclosed cartridge member having the insect attractant positioned therein totally into a hollow housing; and positionally aligning at least one opening in the cartridge member with at least one opening in the housing so that attracted insects pass first directly through the at least one opening of said housing prior to entering into any opening in the cartridge member and then into the at least one opening of the cartridge member and do not have ready access between inner walls of the housing and outer walls of the cartridge member.

17. A method as defined by claim 16, wherein the cartridge member further comprises an enclosed and hollow cartridge member so as to reduce physical and visual contact with internal contents therein, the cartridge member including first and second portions, wherein the step of positioning an attractant within the cartridge member comprises the steps of:

positioning the attractant within the first portion of the cartridge member; and attaching the first portion of the cartridge member to the second portion thereof so that the attractant is positioned within the enclosed and hollow cartridge member.

18. A method as defined by claim 17, further comprising:

removing the enclosed and hollow cartridge member from the housing; and disposing of the cartridge member without contacting the internal contents thereof.

* * * * *